United States Patent Office 3,575,892
Patented Apr. 20, 1971

3,575,892
LIQUID BUTANE PROCESS FOR PREPARING FOAMABLE BEADS
Michael Erchak, Jr., Ridgewood, Philip L. Mercier, Ramsey, and Kenneth W. Doak, Wyckoff, N.J., assignors to Dart Industries Inc., Los Angeles, Calif.
No Drawing. Filed Feb. 9, 1968, Ser. No. 704,233
Int. Cl. C08f 47/10; C08v 1/26
U.S. Cl. 260—2.5          8 Claims

ABSTRACT OF THE DISCLOSURE

The process comprises impregnating beads of a polymer such as polystyrene in a non-aqueous environment with liquefied butane at conditions sufficient to maintain the butane in its liquefied state, removing the excess butane from the impregnated beads and recovering the foamable beads.

BACKGROUND OF INVENTION

(1) Field of invention

This invention relates to a process for preparing foamable thermoplastic resins. More particularly, it relates to a process for impregnating styrenic polymer beads in a liquefied blowing agent to produce foamable beads.

Foamable beads containing a blowing or foaming agent are widely used in the production of rigid polymer foams. The blowing agent has a boiling point below the softening point of the thermoplastic beads and exerts very little solvent action on the beads. When the foamable beads are heated to their softening point, the blowing agent vaporizes causing the beads to expand to about 5 to 30 times their original size. The foamable beads are easily molded into a wide variety of useful articles including cups, packaging materials, refrigerator and structural components, insulation board and the like.

(2) Description of prior art

The prior art discloses various processes for impregnating thermoplastic beads with blowing agents including butane to produce foamable beads. In U.S. Pat. 2,893,963, one such process is described in which polystyrene beads, which are prepared by an aqueous suspension polymerization process, are treated with a liquefied $C_4$ hydrocarbon mixture blowing agent consisting predominately of butane while still in aqueous suspension. This prior art process requires the use of certain nonreactive liquid solvents or swelling agents in addition to the conventional suspension stabilizing systems.

Other prior art processes for treating styrenic polymers with low boiling aliphatic hydrocarbon blowing agents including butane in aqueous suspensions are described in U.S. Pats. 2,888,410, and 3,085,073. Each of these processes requires the use of an aqueous diluent and suspension stabilizers and other media to insure sufficient incorporation of the aliphatic hydrocarbon into the thermoplastic beads. In the process of Pat. 3,265,643, a blowing agent such as butane in its gaseous form is incorporated into polystyrene in an aqueous suspension in which the styrene monomer serves as the diluent. However, one of the disadvantages of each of the foregoing processes, is the requirement of additional emulsifying agents, suspending agents and diluents other than butane to properly incorporate the butane blowing agent into the thermoplastic beads.

Other prior art processes disclose the use of dry butane gas to impregnate the styrenic polymer beads in a non-aqueous environment, see U.S. Pats. 3,126,354 and 3,127,360. However, in each of these processes which teach against the use of liquid butane, long periods are required to impregnate the beads with the gaseous butane blowing agent.

SUMMARY OF THE INVENTION

In contrast to these prior art processes, the present invention is directed to a process wherein styrenic thermoplastic beads are impregnated with liquefied butane which serves as both a diluent and a blowing agent. This process results in an improvement over prior art processes which incorporate a blowing agent such as butane into thermoplastic beads to produce foamable beads. In the present process, liquefied butane is incorporated into the beads in relatively short periods in a non-aqueous environment without the use of suspending agents, emulsifying agents and the like.

Therefore, it is an object of the present invention to provide a more efficient process for impregnating styrenic polymer beads with sufficient blowing agent to render them foamable when the beads are heated to their softening point.

In accordance with this invention, there is provided a process for preparing foamable beads which comprises impregnating thermoplastic beads comprising a styrene polymer in an impregnation zone with liquefied butane at conditions sufficient to maintain the butane in its liquefied state. The excess butane is then removed from the thus impregnated beads to yield the foamable beads.

PREFERRED EMBODIMENTS OF THIS INVENTION

In a more specific embodiment of the present invention, styrenic polymer beads are impregnated in an impregnation zone with liquefied butane at conditions sufficient to maintain the butane in its liquefied state, and the beads are then agitated in the impregnation zone at these conditions for a period of about ½ to 25 hours. The impregnation step is carried out preferably at a temperature of less than 40° C. and more preferably in the range of about 25° to 35° C. and at a pressure sufficient to maintain the butane in its liquefied state. The minimum pressure to be employed in this process is the vapor pressure of the liquid butane at the particular temperature employed, i.e., in the range of about 20 p.s.i.g. at 25° C. to about 35 p.s.i.g. at 35° C. Preferably, the beads are agitated in the impregnation zone at the latter conditions for a period of at least 4 hours to incorporate 4 weight percent butane or more into the beads. After the beads have been impregnated with the butane blowing agent, they are separated from the butane diluent and aged to yield the foamable beads.

At least 4 and up to about 20 weight percent butane should penetrate evenly throughout each of the beads to obtain the desired foamable bead product. If less than 4 weight percent butane is incorporated into the beads after impregnation, the beads generally will not expand properly when heated to their softening temperature and will yield a higher density product after foaming. If the butane does not penetrate evenly to the center of each of the beads, the resulting beads will have what is termed "hard cores." Molded articles prepared from beads having less than 4 weight percent butane after impregnation and having these hard cores will contain surface defects and have densities higher than desired which often render the articles ineffective for their intended use.

The thermoplastic resins used in the process of this invention comprise homopolymers of styrene, copolymers of styrene containing a major portion of styrene and blends of styrene polymers with copolymers, i.e., butadiene-styrene copolymers. Such resins have a glass transition temperature of above 50° C. and usually about 85° to 100° C. The resins are employed in the process of this invention in the form of discrete particles or beads having an average particle size of between about 10 to 60 mesh, preferably between 20 and 40 mesh.

Each of the steps of the process of this invention is carried out in conventional equipment. The impregnation zone comprises, for example, a glass-lined vessel with an agitator. Any suitable means, i.e., steam coils or a steam jacket, can be used for heating the liquid pool to the desired temperature after the beads have been added. The thermoplastic beads can either be added to the vessel prior to adding the liquefied butane, or after, as long as the agitation is commenced immediately after the butane and beads are combined. A close regulation of the temperature in the impregnation zone is important to prevent possible overheating which can result in agglomeration of the beads.

After the beads have been impregnated with the liquefied butane, the butane diluent is removed from the impregnated beads by any conventional liquid-solid separation step such as filtering or centrifuging. Flashing the butane diluent from the beads at ambient temperature and atmospheric pressure is another effective method of separation. This method rapidly lowers the temperature of beads to at least room temperature. The beads from the separation step are cool and dry to the touch, but the surface and interstices of the beads are saturated with the butane blowing agent. An aging step is usually required to dissipate the excess butane blowing agent, primarily from the surface of the beads. In addition during aging the butane blowing agent remaining in the interstices of the beads is allowed to penetrate into the interior of the beads. If the beads are not properly aged, they will have an irregular cell structure after expansion with large cells near the surface and hard cores at the center. One suitable method of aging is to place the beads in a longitudinal vessel and to rotate the vessel causing the beads to tumble for a period of at least 24 hours at 30° C. or below at atmospheric pressure or slightly above. The resulting aged beads have small uniform cell structures throughout the beads after expansion upon microscopic examination.

The following examples illustrate the present invention:

EXAMPLE 1

Polystyrene beads having an average particle size range of 20 to 40 mesh were impregnated with a technical grade of liquefied n-butane containing a minimum purity of 95 mole percent n-butane in a Reid vapor pressure bomb at various periods and conditions to incorporate the butane into the beads as set forth in Table I below:

TABLE I

| Run | Temp., °C. | Time, hours | Pressure, p.s.i.g. | Butane incorporation, weight percent |
|---|---|---|---|---|
| 1 | 20–23 | 64 | 19 | 2.2 |
| 2 | 25 | 41.5 | 20 | 4.5 |
| 3 | 30 | 20 | 25 | 6.0 |
| 4 | 30 | 27.5 | 25 | 7.0 |
| 5 | 32 | 16 | 28 | 5.8 |
| 6 | 35 | 4.5 | 31 | 6.4 |
| 7 | 35 | 16.5 | 31 | 8.0 |
| 8 | 35 | 26.5 | 31 | 8.6 |
| 9 | 35 | 16 | 31 | 5.8 |
| 10 | 35 | 2 | 31 | 3.2 |
| 11 | 40 | 5 | 37 | 5.6 |

Table I indicates that a critical time-temperature relationship exists in the impregnation of the polystyrene beads with liquefied butane. Run 1 indicates that at temperatures less than about 25° C., less than the optimum amount of butane, i.e., at least 4 weight percent butane, was incorporated into the polystyrene beads even after 64 hours of impregnation time. Run 10 indicates that at periods of less than 2 hours, less than 4 weight percent butane was incorporated into the beads even at temperatures as high as 35° C. Although the above examples were carried out without agitation, it was found as described in Example 2 below that sufficient agitation is necessary to prevent agglomeration of the beads during the impregnation step. It was also found that as the temperature is increased to 35° C. and above the bead agglomeration became more pronounced. In run 11 at 40° C., severe agglomeration occurred and the resulting clumps of beads were not easily broken as were the small clumps that formed at the lower temperatures.

EXAMPLE 2

One hundred grams of polystyrene beads of the same type used in Example 1 were added to an autoclave fitted with cooling coils and an anchor-type agitator. In the three runs set forth in Table II below, 500 ml. of the same type of liquefied n-butane used in Example 1 was added to the autoclave to completely immerse the beads and approximately 50 ml. of the n-butane was flashed off to remove other gases from the vapor space above the butane. The temperature during each of the bead impregnation runs was controlled by circulating water from a constant temperature bath through the coils of the autoclave. The agitator speed was set at 200 r.p.m. and the slurry of beads in the liquid pool of n-butane was agitated at this speed for 6 hours. After this period the butane was flashed off and samples of beads from each run were measured for butane content. Table II below summarizes the results:

TABLE II

| Run | Temp., °C. | Time, hours | Pressure, p.s.i.g. | Butane incorporation, weight percent |
|---|---|---|---|---|
| 12 | 20 | 6 | 18 | 0.1 |
| 13 | 29.5 | 6 | 26 | 3.4 |
| 14 | 35 | 6 | 36 | 10.5 |

Table II clearly establishes the strong temperature dependence of impregnating polystyrene beads with liquefied butane at or above its vapor pressure. As the temperature was increased, the level of butane incorporation increased for the same impregnation periods. In run 14 when the temperature was increased to 35° C., some clumps of beads were formed even with agitation. However, these clumps were easily broken into free-flowing beads. Therefore, in order to achieve the desired level of incorporation of liquefied butane into the beads without appreciable bead agglomeration, the impregnation step should take place at 25° to 35° C. and the beads should be continuously agitated throughout the entire impregnation step.

It is apparent that numerous variations can be made in the specific embodiment of this invention without departing from its spirit and all such variations that fall within the scope of the appended claims are intended to be embraced thereby.

What is claimed is:

1. A process for preparing foamable beads which comprises impregnating thermoplastic beads comprising a styrene polymer in an impregnation zone in a non-aqueous environment with liquefied butane at pressure and temperature conditions sufficient to maintain said butane in its liquefied state, removing the excess butane from the impregnated beads and recovering the resulting foamable beads.

2. A process for preparing foamable beads which comprises the following steps:
   (a) impregnating thermoplastic beads comprising a styrene polymer in an impregnation zone with liquefied butane which serves as both a diluent and a blowing agent at pressure and temperature conditions sufficient to maintain said butane in its liquefied state,
   (b) agitating said beads in said impregnation zone at such conditions for a period of about ½ to 25 hours,
   (c) separating the impregnated beads from the butane diluent, and
   (d) aging and recovering the resulting foamable beads.

3. The process of claim 2 wherein impregnating step (a) is carried out at a temperature of less than 40° C.

4. A process for preparing foamable beads which comprises the following steps:
  (a) impregnating polystyrene beads in an impregnation zone with liquefied butane which acts as both a diluent and a blowing agent at a temperature in the range of about 25° to about 35° C. and at a pressure sufficient to maintain said butane in its liquefied state,
  (b) agitating said beads in said impregnation zone at these conditions for a period of at least 4 hours,
  (c) separating the beads impregnated with at least 4 weight percent butane from the butane diluent, and
  (d) aging and recovering the resulting foamable beads.

5. A process according to claim 4 wherein the polystyrene beads have an average particle size in the range of 10 to 60 mesh.

6. A process according to claim 5 wherein the polystyrene beads have an average particle size in the range of 20 to 40 mesh.

7. A process according to claim 4 wherein the beads are impregnated with 4 to 20 weight percent butane.

8. A process according to claim 2 wherein the impregnated beads are separated from the butane diluent by flashing the butane from the beads.

References Cited

UNITED STATES PATENTS

| | | | |
|---|---|---|---|
| 2,888,410 | 5/1959 | Buchholtz | 260—2.5B |
| 2,893,963 | 7/1959 | Cleland et al. | 260—2.5B |
| 3,085,073 | 4/1963 | Lintner et al. | 260—2.5B |
| 3,126,354 | 3/1964 | Day | 260—2.5B |
| 3,127,360 | 3/1964 | Harrison | 260—2.5B |

SAMUEL H. BLECH, Primary Examiner

M. FOELAK, Assistant Examiner

U.S. Cl. X.R.

260—33.6